US010932114B2

(12) United States Patent
Rana

(10) Patent No.: US 10,932,114 B2
(45) Date of Patent: Feb. 23, 2021

(54) SYSTEM AND METHOD OF ACCESSING AN EMERGENCY DISPATCHER IN A FOREIGN COUNTRY

(71) Applicant: Shantanu Rana, Kew Gardens, NY (US)

(72) Inventor: Shantanu Rana, Kew Gardens, NY (US)

( * ) Notice: Subject to any disclaimer, the term of this patent is extended or adjusted under 35 U.S.C. 154(b) by 0 days.

(21) Appl. No.: 15/350,646

(22) Filed: Nov. 14, 2016

(65) Prior Publication Data
US 2017/0142569 A1 May 18, 2017

Related U.S. Application Data

(60) Provisional application No. 62/256,998, filed on Nov. 18, 2015.

(51) Int. Cl.
*H04W 4/90* (2018.01)
*H04W 4/02* (2018.01)
*G01S 19/17* (2010.01)

(52) U.S. Cl.
CPC .............. *H04W 4/90* (2018.02); *G01S 19/17* (2013.01); *H04W 4/023* (2013.01); *H04M 2250/10* (2013.01)

(58) Field of Classification Search
CPC ..... H04W 88/06; H04W 36/14; H04W 36/30; H04W 36/0022; H04W 24/02; H04W 48/18; H04W 24/10; H04W 36/0016; H04W 36/22; H04W 84/042; H04W 36/08; H04W 36/18; H04W 76/00; H04W 76/026; H04W 24/04; H04W 28/0268; H04W 28/0289; H04W 28/08; H04W 36/0061; H04W 36/0066; H04W 36/0088; H04W 72/0486; H04W 72/085; H04W 74/0833; H04W 76/025; H04W 88/02; H04W 88/08; H04W 88/16; H04W 16/14; H04W 16/32;
(Continued)

(56) References Cited

U.S. PATENT DOCUMENTS 9,014,661 B2 * 4/2015 decharms ............... H04W 4/021
455/404.2
2005/0075116 A1 * 4/2005 Laird ....................... A61B 5/04
455/456.3
(Continued)

*Primary Examiner* — George Eng
*Assistant Examiner* — Jing Gao
(74) *Attorney, Agent, or Firm* — Dunlap Bennett & Ludwig, PLLC

(57) ABSTRACT

A system and method of accessing an emergency dispatcher in a foreign country is provided. The system and method includes a mobile device and a database. The mobile device includes at least a microprocessor, a display and a global positioning system. The mobile device is connected to a telecommunications network. The database stores data including a plurality of telephone numbers assigned to a plurality of emergency dispatchers located in different locations in the world. A user may initiate a telecommunication to an emergency dispatcher using the mobile device. When the initiation occurs, the microprocessor determines a location of the mobile device using the global positioning system. The microprocessor then retrieves a telephone number from the database. The telephone number is assigned to the emergency dispatcher within the location of the mobile device.

12 Claims, 6 Drawing Sheets

(58) Field of Classification Search
CPC .............. H04W 28/0236; H04W 28/16; H04W 36/0083; H04W 36/165; H04W 36/26; H04W 48/20; H04W 52/0209; H04W 52/0216; H04W 72/0413; H04W 88/10; H04W 92/20; H04W 16/08; H04W 28/02; H04W 28/0205; H04W 28/0284; H04W 28/085; H04W 28/26; H04W 36/0044; H04W 36/0094; H04W 36/06; H04W 36/24; H04W 48/06; H04W 48/17; H04W 52/0229; H04W 74/006; H04W 76/041; H04L 65/1016; H04L 65/80; H04L 43/08

See application file for complete search history.

(56) References Cited

U.S. PATENT DOCUMENTS

| | | | |
|---|---|---|---|
| 2010/0261448 A1* | 10/2010 | Peters | H04W 4/90 455/404.1 |
| 2013/0174205 A1* | 7/2013 | Jacobsen | H04N 21/43637 725/81 |
| 2014/0072111 A1* | 3/2014 | Klaban | H04W 4/029 379/45 |
| 2014/0120863 A1* | 5/2014 | Ferguson | H04M 1/72541 455/404.2 |
| 2014/0368601 A1* | 12/2014 | decharms | H04W 4/021 348/14.02 |
| 2015/0065077 A1* | 3/2015 | Kim | H04W 4/90 455/404.1 |
| 2015/0288797 A1* | 10/2015 | Vincent | H04W 4/90 455/404.2 |
| 2016/0334231 A1* | 11/2016 | McDonnell | G08B 25/016 |

\* cited by examiner

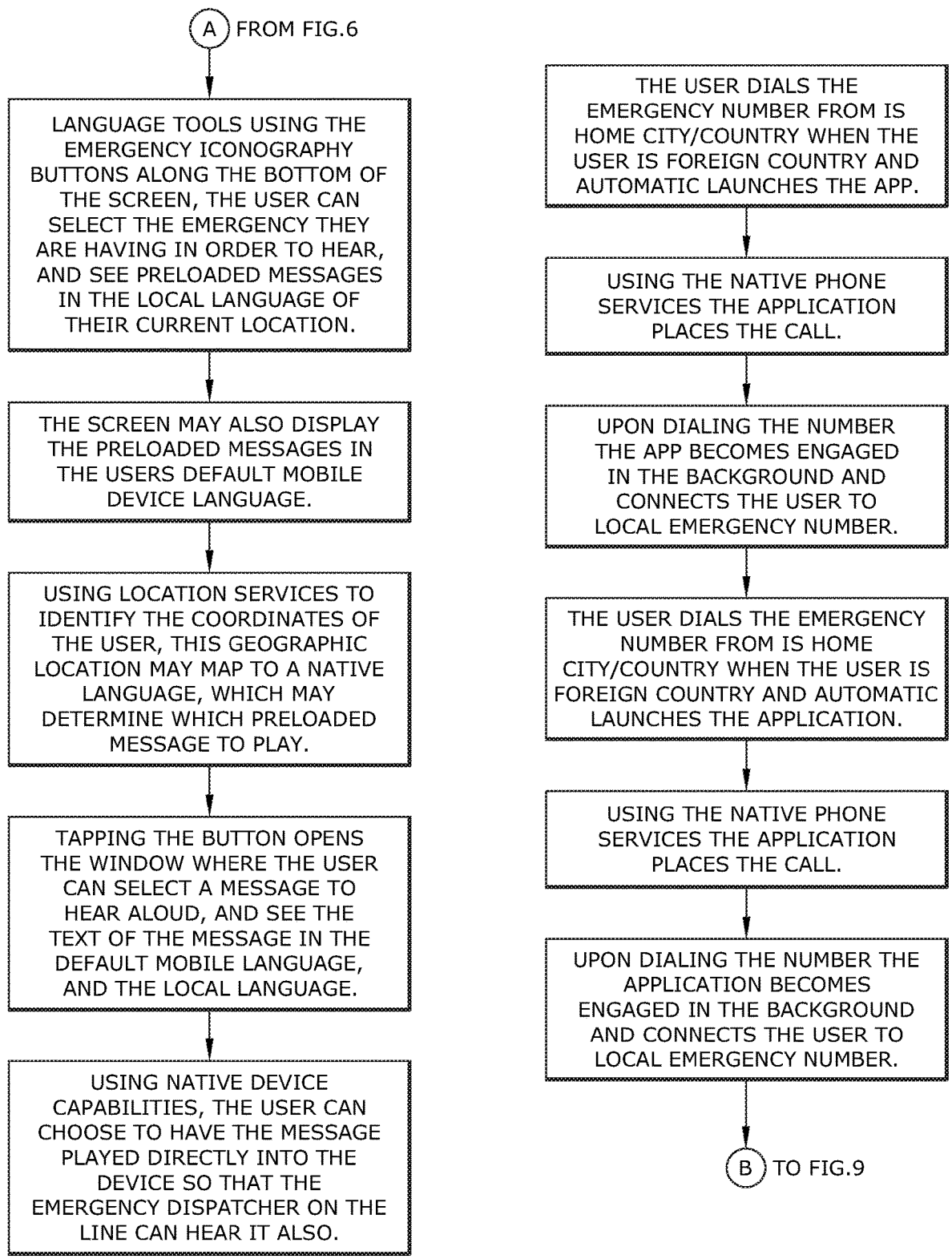

SYSTEM AND METHOD OF ACCESSING AN EMERGENCY DISPATCHER IN A FOREIGN COUNTRY

CROSS-REFERENCE TO RELATED APPLICATION

This application claims the benefit of priority of U.S. provisional application No. 62/256,998, filed Nov. 18, 2015, the contents of which are herein incorporated by reference.

BACKGROUND OF THE INVENTION

The present invention relates to contacting emergency services and, more particularly, to a system and method of accessing an emergency dispatcher in a foreign country.

In many countries, the public telephone network has a single emergency telephone number (sometimes known as the universal emergency telephone number or the emergency services number) that allows a caller to contact local emergency services for assistance. The emergency number differs from country to country; it is typically a three-digit number so that it can be easily remembered and dialed quickly. Some countries have a different emergency number for each of the different emergency services; these often differ only by the last digit.

Currently, users need to dial a variety of different phone numbers in different countries to reach an emergency service. For example, in the U.S. users dial 911, in Australia the number is 000, and in India the number can be 100, 101, or 102. During an emergency, a user that is within a foreign country may not know the emergency telephone number. If the emergency is serious, the inability to contact a local emergency service can be detrimental.

As can be seen, there is a need for a system and method to contact emergency services in foreign countries.

SUMMARY OF THE INVENTION

In one aspect of the present invention, a method of accessing an emergency dispatcher in a foreign country comprises the steps of: providing a mobile device comprising a microprocessor, a display and a global positioning system, wherein the mobile device is connected to a telecommunications network; providing a database storing data comprising a plurality of telephone numbers assigned to a plurality of emergency dispatchers located in different locations; initiating a telecommunication to an emergency dispatcher from the mobile device, wherein the microprocessor determines a location of the mobile device using the global positioning system; and retrieves a telephone number from the database, wherein the telephone number is assigned to the emergency dispatcher within the location of the mobile device.

In another aspect of the present invention, a system of accessing an emergency dispatcher in a foreign country comprises: a database storing data comprising a plurality of telephone numbers assigned to a plurality of emergency dispatchers located in different locations, a mobile device comprising a microprocessor, a display and a global positioning system, wherein the mobile device is connected to a telecommunications network, wherein initiating a telecommunication to an emergency dispatcher on the mobile device prompts the microprocessor to: determine a location of the mobile device using the global positioning system; and retrieve a telephone number from the database, wherein the telephone number is assigned to the emergency dispatcher within the location of the mobile device.

These and other features, aspects and advantages of the present invention will become better understood with reference to the following drawings, description and claims.

BRIEF DESCRIPTION OF THE DRAWINGS

FIG. 7 is a continuation of FIG. 6;

FIG. 8 is a flowchart of an embodiment of the present invention; and

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a system that contacts emergency services from mobile devices without the user knowing the local emergency number. The present invention helps travelers in an unfamiliar area access help from emergency dispatchers, when they may not know the correct telephone number to dial. In certain embodiments, the present invention includes an application that uses a global position system within a mobile device to locate the user. The user's location is then mapped to a database of locations and emergency numbers. The application then calls the appropriate phone number based on the user's location. Additionally, the application may also use the user's location to provide translations of simple phrases in the local dialect.

Figure 1:
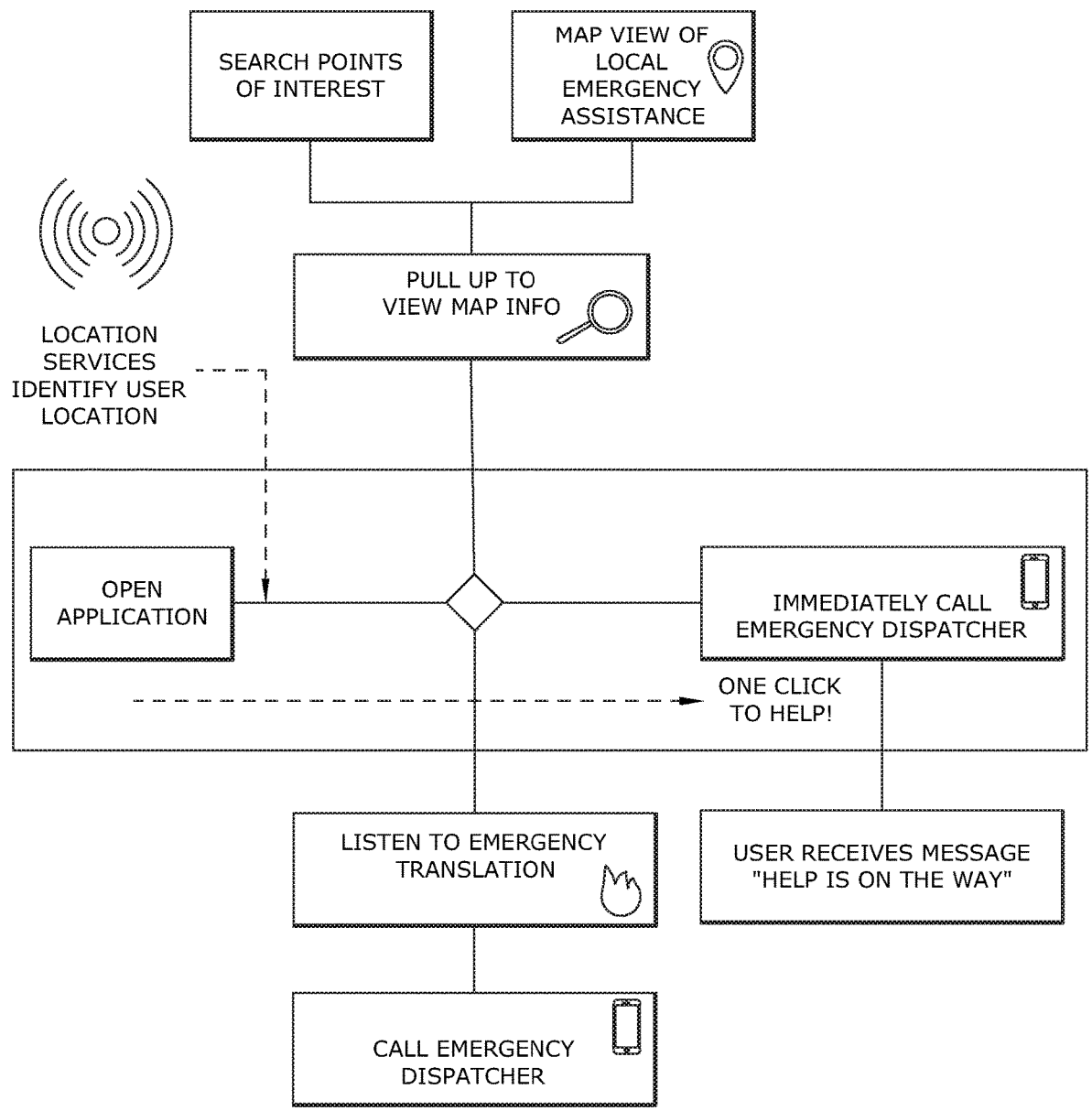
FIG. 1 is a flowchart of an embodiment of the present invention.
Figure 2:
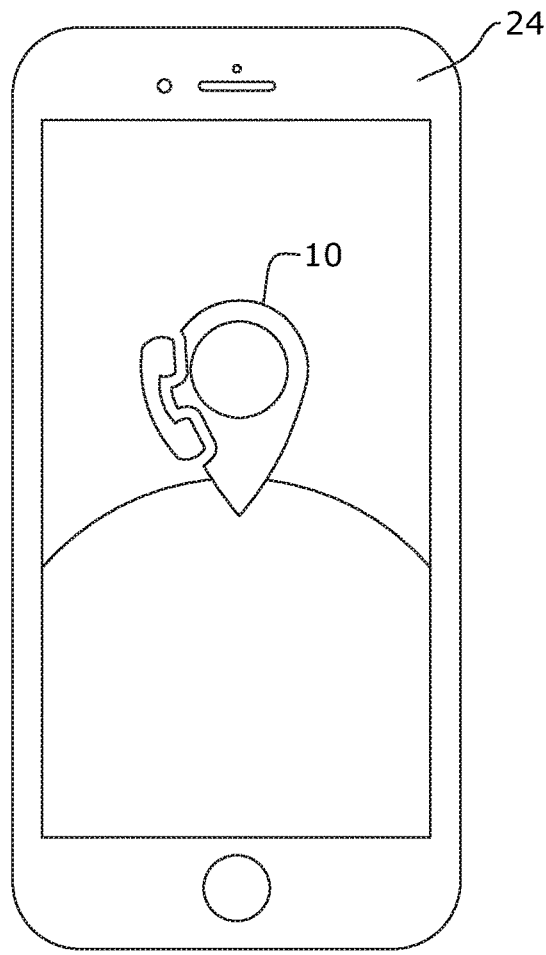
FIG. 2 is a screen shot of an exemplary application of an embodiment of the present invention.
Figure 3:
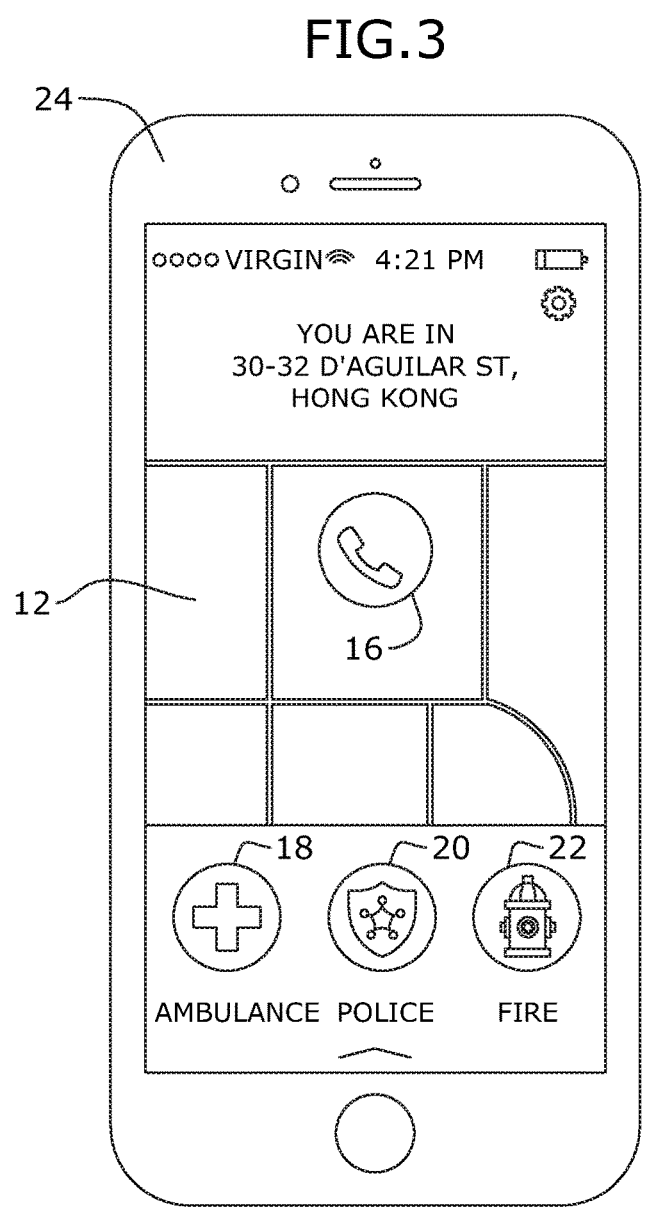
FIG. 3 is a screen shot of an exemplary application of an embodiment of the present invention.
Figure 4:
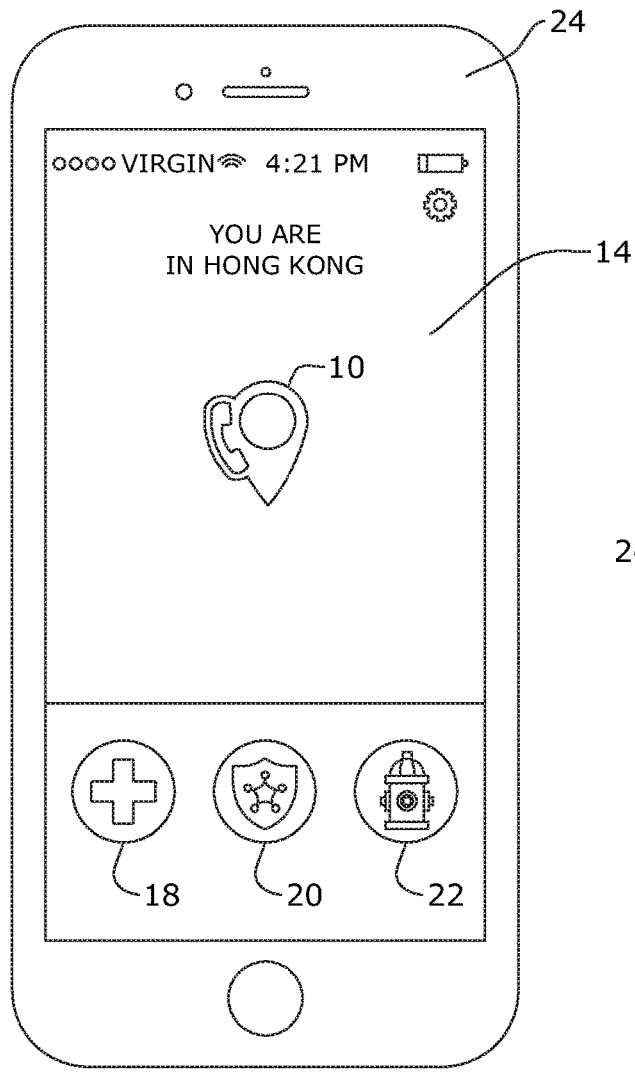
FIG. 4 is a screen shot of an exemplary application of an embodiment of the present invention.
Figure 5:
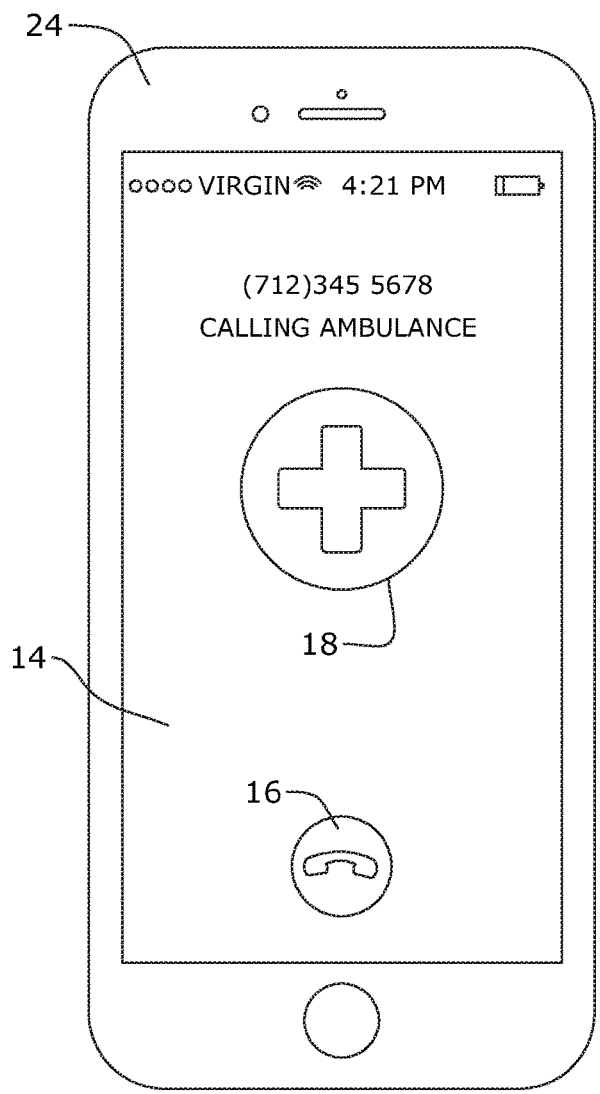
FIG. 5 is a screen shot of an exemplary application of an embodiment of the present invention.

Referring to FIGS. 1 through 5, the present invention may include a mobile device 24 and a database. The mobile device 24 include at least a microprocessor, a display 14 and a global positioning system. The mobile device 24 is connected to a telecommunications network. The database stores data including a plurality of telephone numbers assigned to a plurality of emergency dispatchers located in different locations in the world, i.e. different countries. A user may initiate a telecommunication to an emergency dispatcher using the mobile device 24. When the initiation occurs, the microprocessor determines a location of the mobile device 24 using the global positioning system. The microprocessor then retrieves a telephone number from the database. The telephone number is assigned to the emergency dispatcher within the location of the mobile device 24.

The mobile device 24 may be any electronic device that has access to a telecommunications network. For example, the mobile device 24 may be a smart device, such as a smart phone and a tablet with a touch screen display. In such embodiments, the present invention may include a software loaded onto the memory of the smart device. The software may be in the form of an application. In such embodiments, the user may initiate the telecommunication to the emergency dispatcher by first opening the application on the smart device. A calling symbol 10 is then projected onto the display 14 of the smart device. The user may then select the calling symbol 10 by touching the portion of the screen displaying the calling symbol 10. The location of the smart device is determined and the emergency number of the location is retrieved from the database. The database may be remote and thereby may be retrieved over the telecommunications network. Once the mobile device 24 retrieves the emergency number, the mobile device 24 may automatically dial the number.

In certain embodiments, initiating the telecommunication may be performed by dialing the user's local emergency number. In such embodiments, the application on the mobile device 24 recognizes that the number dialed is an emergency number. The microprocessor determines a location of the mobile device 24 using the global positioning system. The microprocessor then retrieves a telephone number from the database that is assigned to the emergency dispatcher within the location of the mobile device 24. For example, if the user is in Australia and is a native of the United States of America, the user may dial 911 on the mobile device 24. The application recognizes 911 as being an emergency number. The application then determines the user is in Australia and retrieves and dials the number 000.

As mentioned above, certain countries have different telephone numbers for different types of emergency dispatchers. For example, India has an emergency telephone number for calling an ambulance, police department and fire department. In such embodiments, the microprocessor retrieves more than one telephone number from the database. Each of the telephone numbers are assigned to a different type of emergency dispatch within the location. The microprocessor prompts a plurality of calling symbols 10 to project on the display 14 of the mobile device 24. Each of the plurality of calling symbols dials a different telephone number when selected. As illustrated in the Figures, the present invention may project an ambulance symbol 18, a police symbol 20 and a fire department symbol 22. The user may select the calling symbols 10 based on the type of emergency the user is having.

The application of the present invention may also project a map 12 on the display 14. The map 12 may include the location of the mobile device 24. A ticker may mark the location of the mobile device 24 within the map 12. In certain embodiments, the application of the present invention may also project a text of an address that is closest to the location of the mobile device 24. The ticker may be in the form of a calling symbol 16 which may be used to call the local emergency dispatcher. In such embodiments, the microprocessor may use the global positioning system to display the map 12 and the ticker.

The present invention may further project messages in the local language of the area. The messages may be stored in the database and linked to the emergency telephone numbers. In such embodiments, the mobile device 24 includes a speaker. The microprocessor retrieves the messages and projects the emergency message from the speaker of the mobile device 24. The message is in the local language and dialect of the location of the mobile device 24. For example, if the user is in China, the speaker projects an emergency message in Chinese.

In certain embodiments, the present invention may include a set of different messages. Therefore, a user may select a particular message that best suits the emergency situation. In such embodiments, the microprocessor may project the plurality of messages on the display in a text format. The text format is in a default language preset on the mobile device 24. For example, the default language of the mobile device may be preset to English. The text format of the plurality of messages is thereby in English. When the user selects one of the messages from the touch screen display 12, the speaker projects the emergency message from the speaker in a different language, such as Chinese if the user is in China. In certain embodiments, the message may also be transmitted over the telecommunications network to the emergency dispatcher. Therefore, the user may send messages to the local emergency dispatcher in the local language of the area.

Figure 6:
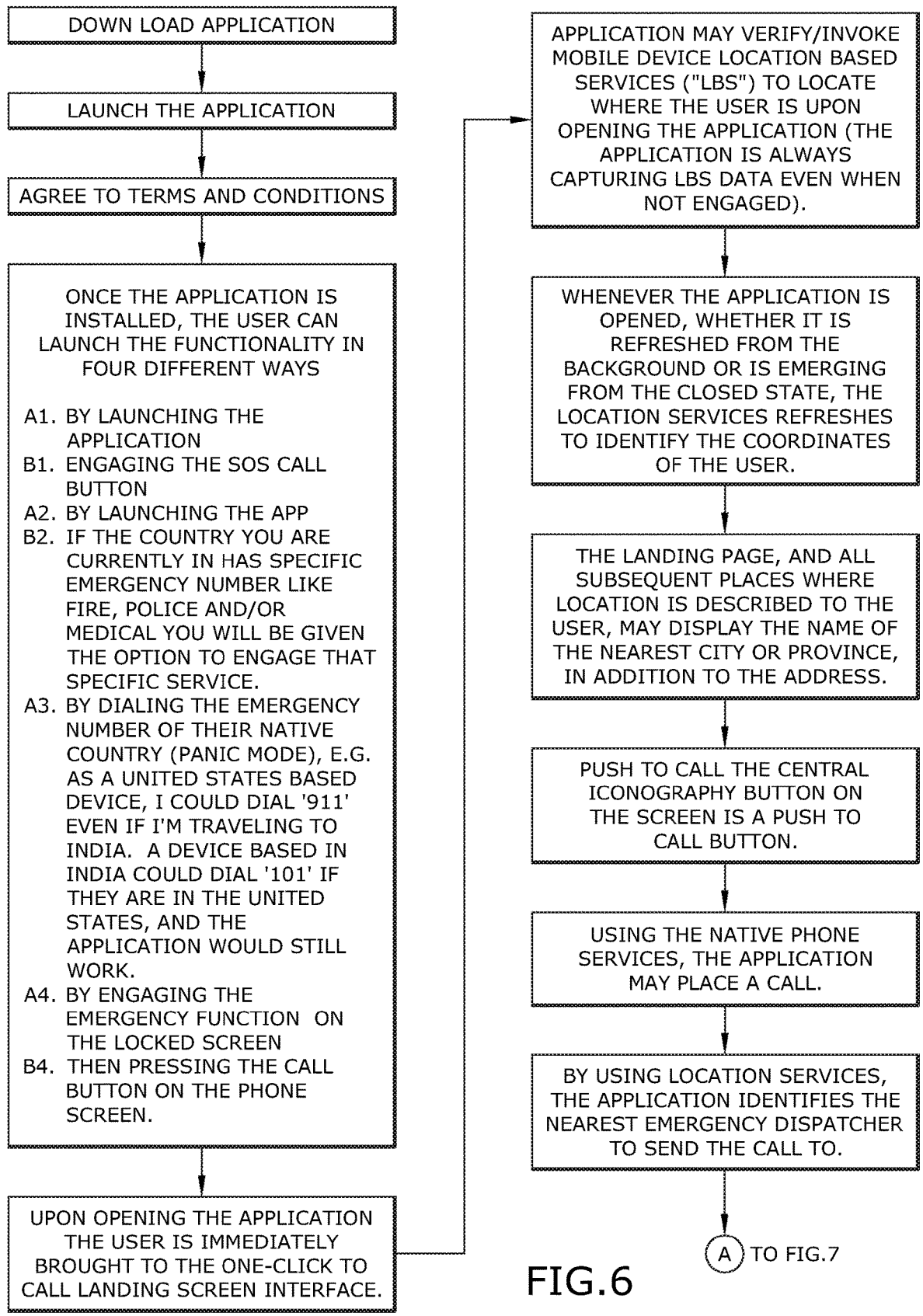
FIG. 6 is a flowchart of an embodiment of the present invention.
Figure 9:
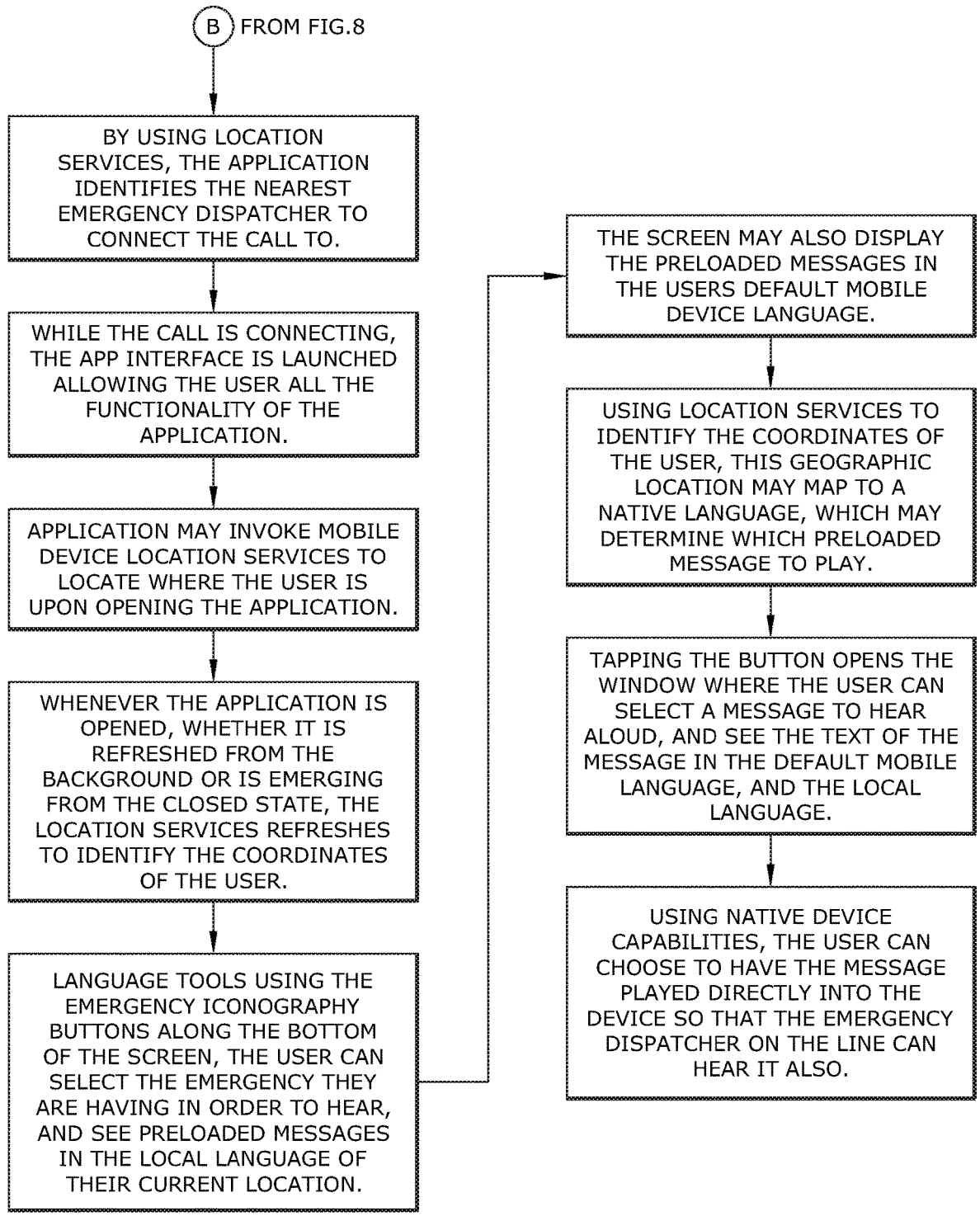
FIG. 9 is a continuation of FIG. 8.

Referring now to FIGS. 6 through 9, the present invention may include the following method steps:
1. Download the application on the mobile device
2. Launch the application
3. Agree to Terms and Conditions
4. Upon opening the application the user is brought to the one-click to call landing screen interface.
5. The application may invoke mobile device Location Services to locate where the user is upon opening the application.
6. Whenever the application is opened, whether it is refreshed from the background or is emerging from the closed state, the location services may refresh to the coordinates of the mobile device.
7. The Landing page, and all subsequent places where location is described to the user, may display the name of the nearest City or Province, in addition to the address
8. Push to Call the central button on the screen is a push to call button
9. Using the native phone services, the application may place a call.
10. By using location services, the application identifies the nearest emergency dispatcher to send the call to.
11. Language tools using the emergency iconography buttons along the bottom of the screen, the user can select the emergency they are having in order to hear, and see preloaded messages in the local language of their current location.
12. The screen may also display the preloaded messages in the users default mobile device language.
13. Using location services to identify the coordinates of the user, this geographic location may map to a native language, which may determine which preloaded message to play.
14. Tapping the button opens the window where the user can select a message to hear aloud, and see the text of the message in the default mobile language, and the local language
15. Using native device capabilities, the user can choose to have the message played directly into the device so that the emergency dispatcher on the line can hear it also.

Upon opening the application the user is brought to the one-click to call landing screen interface. Elements on this page may include the menu which may reside in the top left hand corner. Location Application invokes Location Services to locate where the user is upon opening the application. Whenever the application s opened, whether it is refreshed from the background or is emerging from the closed state, the location services may refresh to identify the coordinates of the user. The Landing page, and all subsequent places where location is described to the user, may display the name of the nearest City or Province, in addition to the address. Push to Call the central button on the screen is a push to call button. Using the native phone services, the application may place a call. By using location services, the application identifies the nearest emergency dispatcher to send the call to. Language tools using the emergency iconography buttons along the bottom of the screen, the user can select the emergency they are having in order to hear, and see preloaded messages in the local language of their current location. The screen may also display the preloaded messages in the users default mobile device language. Using location services to identify the coordinates of the user, this geographic location may map to a native language, which may determine which preloaded message to play. Tapping the button may open a window where the user can select a message to hear aloud, and see the text of the message in the default mobile language, and the local language. Using native device capabilities, the user can choose to have the message played directly into the device so that the emergency dispatcher on the line can hear it also. Using the location of the user's nearest City or Province, the application may provide the background imagery for the location of the user. The user may slide to reveal a map in which the user can forgo placing a call. In such embodiments, the user may slide up a display tray at the bottom of the screen to reveal the map and a points of interest functionality.

It should be understood, of course, that the foregoing relates to exemplary embodiments of the invention and that modifications may be made without departing from the spirit and scope of the invention as set forth in the following claims.

What is claimed is:

1. A method of accessing an emergency dispatcher in a foreign country comprising steps of:
   providing a mobile device comprising a microprocessor, a memory, a display, a speaker, and a global positioning system, wherein the mobile device is connected to a telecommunications network and an emergency application is loaded on the memory;
   activating the emergency application on the mobile device, wherein upon activating of the emergency application, the microprocessor
   determines when the mobile device is within one of a plurality of a foreign countries using the global positioning system;
   retrieves a telephone number from a database when the mobile device is within a located foreign country of the plurality of foreign countries, the database storing data comprising a plurality of telephone numbers assigned to a plurality of emergency dispatchers located in different foreign countries, wherein the telephone number is assigned to the emergency dispatcher within the located foreign country;
   produces a calling symbol on the display of the mobile device;
   produces a plurality of preloaded emergency messages on the display in a text format, wherein the text format is in a default language preset on the mobile device;
   selecting the calling symbol on the display of the mobile device to initiate a telecommunication to the emergency dispatcher within the located foreign country; and
   selecting one of the preloaded plurality of messages on the display to play the selected message, wherein the microprocessor retrieves and plays a corresponding preloaded emergency message in a local language of the located foreign country and
   wherein the plurality of preloaded emergency messages and the corresponding preloaded emergency message in the local language of the located foreign country are preloaded on the memory.

2. The method of claim 1, wherein the step of initiating the telecommunication comprises steps of: dialing one of the plurality of telephone numbers assigned to the plurality of emergency dispatchers.

3. The method of claim 1, wherein the database is a remote database accessed by the mobile device over the telecommunications network.

4. The method of claim 1, wherein the microprocessor retrieves more than one telephone number from the database, wherein each of the more than one telephone numbers are assigned to a different type of emergency dispatch within the located foreign country.

5. The method of claim 4, wherein the microprocessor prompts a plurality of calling symbols to project on the display of the mobile device, wherein each of the plurality of calling symbols dials a different of the more than one telephone number when selected.

6. The method of claim 1, wherein the microprocessor projects a map on the display, wherein the map comprises a ticker marking a location of the mobile device.

7. The method of claim 1, wherein the microprocessor projects an address on the display, wherein the address is a closest address to the mobile device.

8. The method of claim 1, wherein the corresponding preloaded emergency message is transmitted over the telecommunications network to the emergency dispatcher within the located foreign country.

9. A system of accessing an emergency dispatcher in a foreign country comprising:
   a mobile device comprising a microprocessor, a display, a memory, a speaker, and a global positioning system, wherein the mobile device is connected to a telecommunications network and an emergency application is loaded on the memory, wherein activating the emergency application on the mobile device prompts the microprocessor to:
   determine when the mobile device is within one of a plurality of a foreign countries using the global positioning system,
   retrieve a telephone number from a database when the mobile device is within a located foreign country of the plurality of foreign countries, the database storing data comprising a plurality of telephone numbers assigned to a plurality of emergency dispatchers located in different foreign countries, wherein the telephone number is assigned to the emergency dispatcher within the located foreign country,
   produce a calling symbol on the display of the mobile device, wherein selecting the calling symbol initiates a telecommunication to the emergency dispatcher within the located foreign country, and
   produce a plurality of preloaded emergency messages on the display in a text format, wherein the text format is in a default language preset on the mobile device, wherein selecting one of the preloaded plurality of messages on the display plays a corresponding preloaded emergency message from the mobile device in a local language of the located foreign country, wherein the plurality of preloaded emergency messages and the corresponding preloaded message in the local language of the located foreign country are preloaded on the memory.

10. The system of claim 9, wherein the database is a remote database accessed by the mobile device over the telecommunications network.

11. The system of claim 9, wherein the microprocessor retrieves more than one telephone number from the database, wherein each of the more than one telephone numbers are assigned to a different type of emergency dispatch within the located foreign country.

12. The system of claim 11, wherein the microprocessor projects a plurality of calling symbols on the display of the mobile device, wherein each of the plurality of calling symbols dials a different of the more than one telephone number when selected.

\* \* \* \* \*